United States Patent Office 3,707,542
Patented Dec. 26, 1972

3,707,542
DIALKYL-4-HYDROXYPHENYLCARBOXYLATES
OF TRIS(HYDROXY-ALKYL) ISOCYANURATE
David H. Steinberg, Bronx, and Martin Dexter, Briarcliff
Manor, N.Y., assignors to Ciba-Geigy Corporation,
Greenburgh, N.Y.
No Drawing. Filed Feb. 25, 1971, Ser. No. 118,967
Int. Cl. C07d 55/38
U.S. Cl. 260—248 NS    8 Claims

ABSTRACT OF THE DISCLOSURE

Esters of tris(hydroxyalkyl)isocyanurates with dialkyl-4-hydroxyphenyl carboxylic acids are stabilizers of organic material. The compounds, of which tris{2-[3-(3,5-di-tert.butyl - 4 - hydroxyphenyl)propionyloxy]-ethyl}isocyanurate is a typical embodiment, are prepared through esterification of tris (2-hydroxyethyl) isocyanurate.

DETAILED DESCRIPTION

The invention described herein pertains to a class of organic triesters which can be diagrammatically depicted by the structural formula:

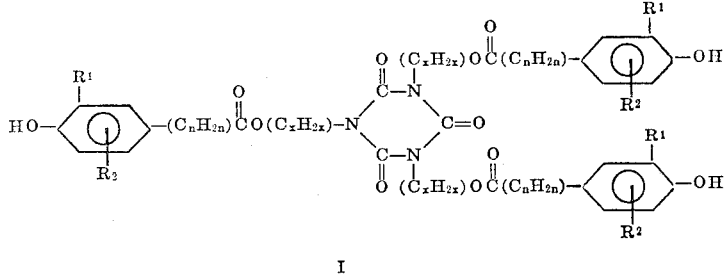

I

In the compounds depicted by Formula I, each of $R^1$ and $R^2$ is the same or different alkyl group of from 1 to 4 carbons, i.e., methyl, ethyl, n-propyl, isopropyl, n-butyl, sec-butyl or tert-butyl. The symbol $n$ may be 1 or 2, thus embracing the appropriately substituted phenylacetic acid and phenylpropionic acids esters of tris (hydroxyalkyl) isocyanurate. The symbol $x$ is an integer from 1 to 6.

These compounds are stabilizers of organic materials wich are otherwise subject to thermo-oxidative and/or actinic deterioration. Thus, through the incorporation in various substrates of from about 0.005 to about 5% (by weight) of one or more of these compounds, either alone or in combination with other stabilizers such as dilauryl-thiodipropionate, distearylthiodipropionate, ultraviolet light absorbers, and the like, there is observed a significant increase in the stability of the substrate. Such substrates include synthetic organic polymeric substances, such as vinyl resins, formed from the polymerization of vinyl halides or from the copolymerization of vinyl halides with unsaturated polymerizable compounds, e.g., vinyl esters, $\alpha,\beta$-unsaturated hydrocarbons such as butadienes and styrene; polyolefins such as polyethylene, polypropylene, polybutylene and polyisoprene, including copolymers of olefins with other ethylenically unsaturated comonomers; polyurethanes and polyamides such as polyhexamethylene adipamide and polycaprolactam; polyesters such as polyethylene terephthalates; polycarbonates; polyacetals; polystyrene; polyethyleneoxide; copolymers of the foregoing such as those of high impact polystyrene containing copolymers of butadiene and styrene and those formed by the copolymerization of acrylonitrile, butadiene and/or styrene. Other materials which are stabilized by these triesters include lubricating oil of the aliphatic ester type such as di(2-ethylhexyl)azelate and pentaerythritol tetracaproate; animal and vegetable derived oils and fats such as linseed oil, animal fat, tallow, lard, peanut oil, cod liver oil, castor oil, palm oil, corn oil and cottenseed oil; and hydrocarbon materials such as gasoline, mineral oil, fuel oil, drying oil, cutting fluids, waxes, resins and fatty acids such as soaps.

These triesters can be prepared through esterification of tris(hydroxyalkyl)isocyanurate with a dialkyl-4-hydroxyphenyl carboxylic acid derivative of the formula:

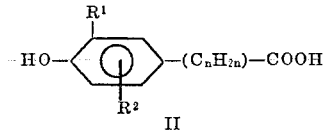

II wherein $R^1$, $R^2$ and $n$ are as previously defined. This derivative can be either the free acid, an acid halide thereof such as the acid chloride or acid bromide, or an acid anhydride thereof. When the free acid is employed, the esterification is preferably conducted in an inert non-aqueous organic solvent in the presence of an acid catalyst. An inert non-aqueous organic solvent is also preferably employed when the acid halide or anhydride is utilized, together with an acid acceptor such as triethylamine or dimethylaniline.

Other esterification techniques, such as transesterification with an alkyl ester of the derivatives of Formula II, or utilization of an alkali metal salt of these derivatives with a tris(haloalkyl)isocyanurate in a manner known per se can also be employed. Thus, for example, the methyl ester of the acid depicted by Formula II and tris(hydroxyalkyl) isocyanurate are heated in the presence of a catalyst such as sodium methoxide or dibutyltin oxide with removal of the methanol thus formed.

Alternatively a tris(alkali metal)cyanurate or isocyanurate can be reacted with a haloalkyl ester of the derivative of Formula II, analogously to the procedure described in U.S. Pat. No. 3,249,607 to Taub et al.

The product obtained according to these procedures can be purified to the degree desired through conventional techniques such as recrystallization or chromatography.

The following examples will serve to further illustrate the nature of the present invention.

EXAMPLE 1

Tris{2-[3-(3,5-di-tert.butyl-4-hydroxyphenyl)propionyloxy]ethyl}isocyanurate

A mixture of 48.3 g. (0.165 mole) of methyl 3-(3,5-di-tert.butyl-4-hydroxyphenyl)propionate, 13.06 g. (0.05 mole) of tris(2-hydroxyethyl)isocyanurate and 1.87 g. (0.0075 mole) of dibutyltin oxide is first heated at 135°–140° C. under nitrogen for 4 hours, and then at 130° C./0.1–0.2 mm. for 3 hours. The cooled reaction mixture is next dissolved in 100 ml. of dry benzene, filtered through 600 g. of alumina, and washed with about 1 l. of benzene. The combined filtrate and washings are evaporated under vacuum and the product (48.3 g.) is further purified through several recrystallizations from heptane. The tris {2-[3-(3,5-di-tert.butyl - 4 - hydroxyphenyl)propionyloxy] ethyl}isocyanate melts in the range of 101–106° C. A typical analysis is as follows: Calc. for $C_{60}H_{87}O_{12}N_3$ (percent): C, 69.14; H, 8.41; N, 4.07. Found (percent): C, 69.42; H, 8.81; N, 3.96.

In a similar fashion utilizing 46 g. of methyl 3,5-ditert.butyl-4-hydroxyphenylacetate in the above procedure in place of the designated quantity of methyl 3-(3,5-di-tert.butyl-4-hydroxyphenyl)propionate, there is obtained tris [2-(3,5-di-tert.butyl-4 - hydroxyphenylacetoxy)ethyl]isocyanurate.

EXAMPLE 2

Tris{2-[3-(3-methyl-4-hydroxy-5-tert.butylphenyl)propionyloxy]ethyl}isocyanurate Following the procedure of Example 1, 43.7 g. of ethyl 3-(3'-methyl-5'-t - butyl - 4' - hydroxyphenyl)propionate, 13.06 g. of tris(2-hydroxyethyl)isocyanurate and 1.87 g. of dibutyltin oxide were reacted. 45 g. of the product was obtained which was purified by passing a benzene solution of the product through alumina. The purified material was a glass which melted around 70° C.

EXAMPLE 3

Tris{2-[3-(3,5-dimethyl-4-hydroxyphenyl)propionyloxy]ethyl}isocyanurate

A mixture of 20.3 g. of 3-(3,5-dimethyl-4-hydroxyphenyl)propionic acid, 8.36 g. of tris(2-hydroxyethyl)isocyanurate, 1.72 g. of toluenesulfonic acid monohydrate and 150 ml. of toluene was heated for 4 hours at reflux with continuous stirring. The reaction mixture was then cooled, washed with water, 6% sodium carbonate and water again until neutral. The solution was dried over molecular sieves, followed by removal of the solvent under vacuum. The residue was a substantially pure product which weight 25.1 g. After drying at 100° C. at 0.1 mm. the following analysis was obtained: Calc. for

(percent): C, 63.87; H, 6.51; N, 5.32. Found (percent): C, 63.81; H, 6.40; N, 5.10.

When the above procedure is repeated employing 3-(3,6-di-t-butyl-4-hydroxyphenyl)propionic acid as the acid reactant, the product tris{2-[3-(3,6-di-t-butyl-4-hydroxyphenyl)propionyloxy]ethyl}isocyanurate is obtained.

EXAMPLE 4

Tris{2-[3-(3methyl-4-hydroxyphenyl)propionyloxy]ethyl}isocyanurate

Following the procedure of Example 3, 18.9 g. of 3-(3-methyl-4-hydroxyphenyl)propionic acid, 8.36 g. oftris(2-hydroxyethyl)isocyanurate, 1.90 g. of toluenesulfonic acid monohydrate and 150 ml. of toluene were reacted giving 22.2 g. of the product. After drying at 125° C./02 mm. the following analysis was obtained: Calc. for

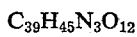

(percent): C, 62.64; H, 6.07; N, 5.62. Found (percent): C, 62,49; H, 6.05; N, 5.58,

EXAMPLE 5

Tris{6-[3-(3,5-di-t-butyl-4-hydroxyphenyl)propionyloxy]hexyl}isocyanurate

A mixture of 19.4 g. of trisodium cyanurate, 536.1 g. of 6-chloro-1-hexanol acetate and 600 g. of dimethylacetamide are heated for about 20 hours at about 125° C. Then the reaction mixture is cooled to 50° C. and filtered. After the purification, tris-(6-acetoxyhexyl)isocyanurate is obtained.

The intermediate prepared above is hydrolyzed by sodium hydroxide in aqueous methanol to give tris(6-hydroxyhexyl)-isocyanurate. This product is then reacted with 3-(3,5-di-t-butyl-4-hydroxyphenyl)propionic acid according to the producedure of Example 3 yielding the above named product.

EXAMPLE 6

Tirs{[3-(3,6-di-t-butyl-4-hydroxyphenyl)-propionyloxy]methyl}isocyanurate

One mole of tris(hydroxymethyl)isocyanurate is reacted with 3 moles of 3-(3,5-di-t-butyl-4-hydroxyphenyl) propionyl chloride in benzene in the presence of 3 moles of dry pyridine. The reaction mixture is then filtered and the solvent stripped under reduced pressure to afford the above-named product.

The preparation of tris(hydroxymethyl)isocyanurate is disclosed in Pazenko et al., Ukr. Khim. Zh. Vol. 30(2), 195–8 (1964), Chem. Abst. 61, 1866d (1964).

EXAMPLE 7

Tris{2-[3-(3,5-di-t-butyl-4-hydroxyphenyl)-propionyloxy]propyl}isocyanurate

A mixture 19.4 g. of trisodium cyanurate, 39.1 g. of 1-chloro-2-propanol acetate and 600 g. of dimethylacetamide is reacted according to the procedure of Example 5. The intermediate product obtained is tris(2-hydroxypropyl)isocyanurate. This material is reacted with 3-(3,5-di-t-butyl-4-hydroxyphenyl)propionyl chloride according to the procedure of Example 6 yielding tris{2-[3-(3,5-di-t-butyl - 4 - hydroxyphenyl)propionyloxy]-propyl}isocyanurate.

What is claimed is:

1. A compound of the formula:

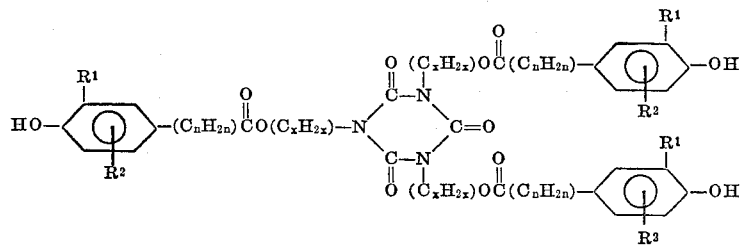

wherein each of $R^1$ and $R^2$ independently is a (lower) alkyl group of from one to four carbon atoms and $R^2$ is also hydrogen, $n$ has a value of 1 or 2, and $x$ has a value of from 1 to 6.

2. A compound according to claim 1 where each of $R^1$ and $R^2$ is methyl or tert.butyl.

3. The compound according to claim 2 which is tris{2-[3-(3,5 - di - tert.butyl - 4 - hydroxyphenyl)propionyloxy]ethyl}isocyanurate.

4. The compound according to claim 2 which is tris[2-(3,5 - di - tert.butyl - 4 - hydroxyphenylacetoxy)ethyl]-isocyanurate.

5. The compound according to claim 2 which is tris{2-[3-(3,5 - dimethyl-4-hydroxyphenyl)propionyloxy]ethyl} isocyanurate, 6. The compound according to claim 2 which is tris{2-[3-(3 - methyl - 4 - hydroxyphenyl)propionyloxy]ethyl} isocyanurate.

7. The compound according to claim 2 which is tris{6-[3-(3,5 - di - t - butyl - 4 - hydroxyphenyl)propionyloxy} isocyanurate.

8. The compound according to claim 2 which is tris-{[3 - (3,5 - di - t - butyl - 4 - hydroxyphenyl)propionyloxy]methyl}isocyanurate.

References Cited

UNITED STATES PATENTS 3,567,724   3/1971   Beears _____ 260—248
3,598,815   8/1971   Gilles _____ 260—248

JOHN M. FORD, Primary Examiner

U.S. Cl. X.R.

99—163; 252—51.5 R, 403; 260—45.8 N